United States Patent
Tobias Granado

(10) Patent No.: US 12,330,831 B2
(45) Date of Patent: Jun. 17, 2025

(54) AUTOMATIC CONDITIONING STATION FOR FROZEN FOODS

(71) Applicant: DISEÑO Y CONSTRUCCIÓN DE MAQUINARIA AUTOMATIZADA, S.L., Buñol (ES)

(72) Inventor: José Antonio Tobias Granado, Buñol (ES)

(73) Assignee: ISENO Y CONSTRUCCIÓN DE MAQUINARIA AUTOMATIZADA, S.L., Buñol (ES)

( * ) Notice: Subject to any disclaimer, the term of this patent is extended or adjusted under 35 U.S.C. 154(b) by 0 days.

(21) Appl. No.: 18/723,462

(22) PCT Filed: Dec. 22, 2021

(86) PCT No.: PCT/ES2021/070917
§ 371 (c)(1),
(2) Date: Jun. 23, 2024

(87) PCT Pub. No.: WO2023/118616
PCT Pub. Date: Jun. 29, 2023

(65) Prior Publication Data
US 2024/0417125 A1    Dec. 19, 2024

(51) Int. Cl.
*B65B 25/06* (2006.01)
*B25J 11/00* (2006.01)
(Continued)

(52) U.S. Cl.
CPC ........... *B65B 57/14* (2013.01); *B25J 11/0045* (2013.01); *B65B 5/06* (2013.01); *B65B 5/105* (2013.01);
(Continued)

(58) Field of Classification Search
CPC ........... B65B 5/06; B65B 5/105; B65B 5/108; B65B 25/065; B65B 35/36; B65B 35/50; B65B 57/14; B25J 11/0045; G01G 19/387
(Continued)

(56) References Cited

U.S. PATENT DOCUMENTS 3,696,584 A * 10/1972 Rickard .................... B65B 1/32
                                                      198/572
4,827,692 A *  5/1989 Fiske et al. ........... B65B 25/065
                                                       53/247
(Continued)

FOREIGN PATENT DOCUMENTS

DE       3830692 A1 *  3/1990
DE     10129226 A1 *  1/2003 ............. B65B 35/50
EP       2179930 A2 *  4/2010 ........... B65B 25/065

OTHER PUBLICATIONS

International Search Report for related patent application PCT/ES2021/070917 prepared by the European Patent Office and having a mailing date of Aug. 25, 2022, in English.
(Continued)

*Primary Examiner* — Stephen F. Gerrity
(74) *Attorney, Agent, or Firm* — Thedford I. Hitaffer; Hitaffer & Hitaffer, PLLC

(57) ABSTRACT

A station includes one or more loading positions; feeder to feed empty boxes to loading positions; loading robot with gripper to take groupings of frozen food and transfer them to the boxes; scale to automatically weigh the boxes; and dispenser to automatically deposit individual units of frozen food in the loaded boxes. The conditioning station is controlled for slightly downward loading of the boxes so that at the end of the loading by means of the loading robot it is not necessary to remove any individual unit of frozen food from the box, as well as so that, after depositing by the dispenser, the weight of the loaded box is equal to or greater than a
(Continued)

predetermined set point within a predetermined tolerance. It enables the loading to be automated and the weight of the boxes of frozen food to be optimised.

21 Claims, 4 Drawing Sheets

(51) Int. Cl.
  *B65B 5/06* (2006.01)
  *B65B 5/10* (2006.01)
  *B65B 35/36* (2006.01)
  *B65B 35/50* (2006.01)
  *B65B 57/14* (2006.01)
  *G01G 19/387* (2006.01)

(52) U.S. Cl.
  CPC ............ *B65B 5/108* (2013.01); *B65B 25/065* (2013.01); *B65B 35/36* (2013.01); *B65B 35/50* (2013.01); *G01G 19/387* (2013.01)

(58) Field of Classification Search
  USPC .................................. 53/502, 539, 240, 263
  See application file for complete search history.

(56) References Cited

U.S. PATENT DOCUMENTS

| | | | |
|---|---|---|---|
| 6,536,599 B1 * | 3/2003 | Nielsen | B65B 35/56 209/540 |
| 6,808,361 B1 * | 10/2004 | Christy et al. | B65B 57/20 198/418.9 |
| 2002/0028127 A1 | 3/2002 | Hart | |
| 2014/0363266 A1 | 12/2014 | Cooper | |

OTHER PUBLICATIONS

Written Opinion by the International Searching Authority for related patent application PCT/ES2021/070917 prepared by the European Patent Office and having a mailing date of Aug. 25, 2022, in English.

* cited by examiner

AUTOMATIC CONDITIONING STATION FOR FROZEN FOODS

CROSS-REFERENCE TO RELATED APPLICATIONS

This application is a national stage under 35 U.S.C. § 371 of PCT patent application PCT/ES2021/070917 filed on 22 Dec. 2021, which is pending and which is hereby incorporated by reference in its entirety for all purposes.

FIELD OF THE INVENTION

The present invention can be included in the food sector, in particular in the frozen food sector. More specifically, the object of the present invention is related to a conditioning station for conditioning frozen food, particularly frozen hamburgers, including beef, chicken, turkey, pork, and vegetable hamburgers.

BACKGROUND OF THE INVENTION

In the food sector, particularly in the elaboration and packaging of previously frozen foods, facilities are known for in-line packaging of prepared and deep-frozen hamburgers, of those intended for large distribution, as well as to large points of sale worldwide, wherein hamburgers are packaged to be sent to the point of sale, where they are finished.

The packaging of frozen hamburgers is especially delicate, since it is carried out manually, in the hamburger processing line itself by means of operators who are dedicated to the manual packaging of a certain number of units in boxes, in stacks oriented either horizontally or vertically, inside the boxes.

As it is a task carried out in a food processing and freezing facility, the working conditions are extreme, since they involve, on the one hand, working at low temperatures and, on the other hand, continuous handling of deep-frozen product, which enhances the extreme cold sensation of the operators, even despite being protected with different PPE against said conditions, such as gloves, gowns, etc.

For this reason, in the sector, these types of jobs are especially critical, so they are to be optimised such that, on one hand, general production is optimised, amortizing human jobs that do not contribute added value, and on the other, from a purely ergonomic point of view, jobs in critical conditions are eliminated.

BRIEF DESCRIPTION OF THE INVENTION

The present invention solves the aforementioned drawbacks, by means of an automatic conditioning station for a frozen food, for example, frozen hamburgers, which makes it possible to combine an automation of the packaging and also an optimisation of the content of the packages, generally boxes.

The conditioning station comprises one or more loading positions, fed with empty boxes by means of a box feeder. There is also at least one scale, preferably one single scale in each corresponding loading position, to automatically weigh the boxes, and at least one loading robot equipped with a gripper to take groupings, such as stacks, of frozen food and transfer them to the boxes in the loading positions, in synchronisation with the feeder. The conditioning station is controlled for under loading of the boxes, so that, after loading by means of the loading robot or robots, the weight of the box is not so high that it exceeds a predetermined lower set point plus a predetermined tolerance, i.e., no individual units have to be removed from the frozen food. Specifically, the configuration seeks to ensure that, at the end of the loading by means of the loading robot(s), the loaded boxes have a weight selected from:

equal to or less than the lower set point; and
higher than the lower set point by a value not higher than the tolerance, so as not to have to remove any individual unit from the frozen food.

Advantageously, the conditioning station further comprises at least one dispenser, to automatically deposit one or more individual units of the frozen food in the loaded boxes. In this case, the configuration seeks to ensure that, after the deposit by the dispenser, the weight of the loaded box is equal to or greater than that of the predetermined lower set point within the predetermined tolerance.

The conditioning station can operate with frozen foods, in particular, with frozen hamburgers, of various formats, with boxes of different sizes and for different weights, both in vertical and horizontal stacks, although with only one format at a time. The frozen food is automatically loaded, i.e., it does not require human intervention. The frozen food is loaded into the boxes according to previous specifications: by number of units of frozen food (for example, hamburgers), by thickness, i.e., total height of stacked units, by weight, or by a combination of several or of all of them, i.e., reaching a number, height and weight within a previously specified range.

It can optionally include a frame intended to introduce a grid pattern into the box, once in the loading position, before being loaded, grid pattern which partitions the box into cells, and therefore defines a predetermined loading format, to facilitate filling. In this way, the orderly loading of the frozen product in the box is simplified, since the loading robot can deposit the frozen products in the box, in the cells, according to a predetermined arrangement according to the configuration of the grid pattern. Likewise, the frame can be configured to clamp a liner within the box, typically a plastic bag, without collapsing or falling into the box.

Loading automation is achieved with precision and speed, as well as complying with amount and weight specifications, without manual operations, such as removal, from the loaded box, of individual units of frozen food, due to excess weight.

BRIEF DESCRIPTION OF THE FIGURES

The previous advantages and features, in addition to others, shall be understood more fully in light of the following detailed description of embodiments, with reference to the following figures, which must be taken by way of illustration and not limitation.

LIST OF REFERENCES

Figure 1:
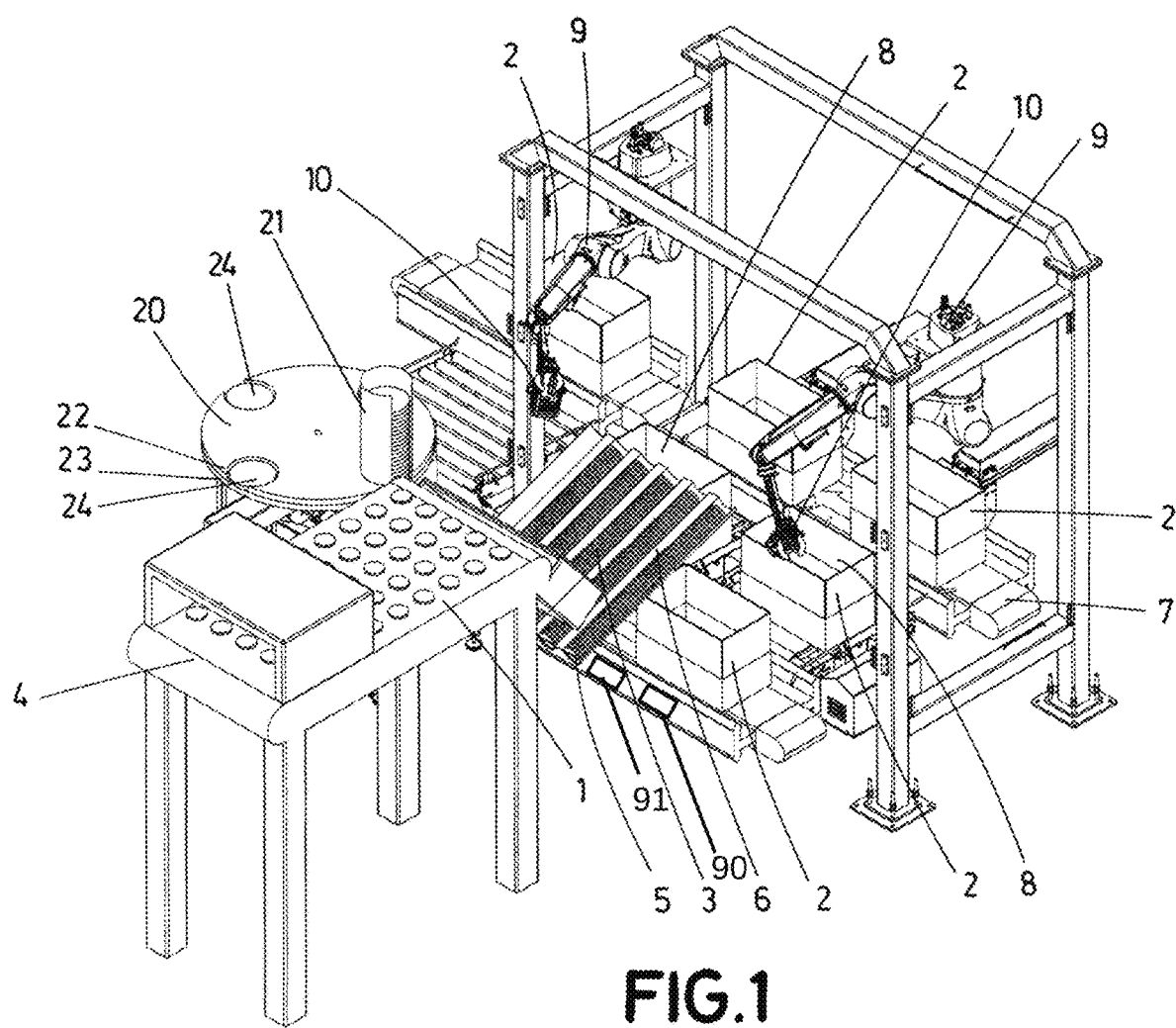
FIG. 1 shows a schematic top perspective view of the conditioning station of the present invention.

1 Frozen food/frozen hamburgers
2 Boxes
3 Groupings/stacks
4 Conveyor belt
5 Grouper/stacker 6 Stacked hamburger supports
7 Empty box feeder
8 Loading positions
9 Loading robot
10 Gripper
11 Sub-stacks
12 Separation means
13 Claws
14 Side hatch
15 Lower hatch
16 Actuator
17 Frame
18 Grid pattern
19 Plastic liner/bag
20 Dispenser
21 Tank
22 Upper plate
23 Lower plate
24 Upper through-holes
25 Hold-down plate
26 Cells
27 Frame
28 Inner tubular portions
29 First drive
30 Connecting rods
31 Closure
32 Second drive
33 Laser
34 Meter

DETAILED DESCRIPTION OF THE INVENTION

Figure 2:
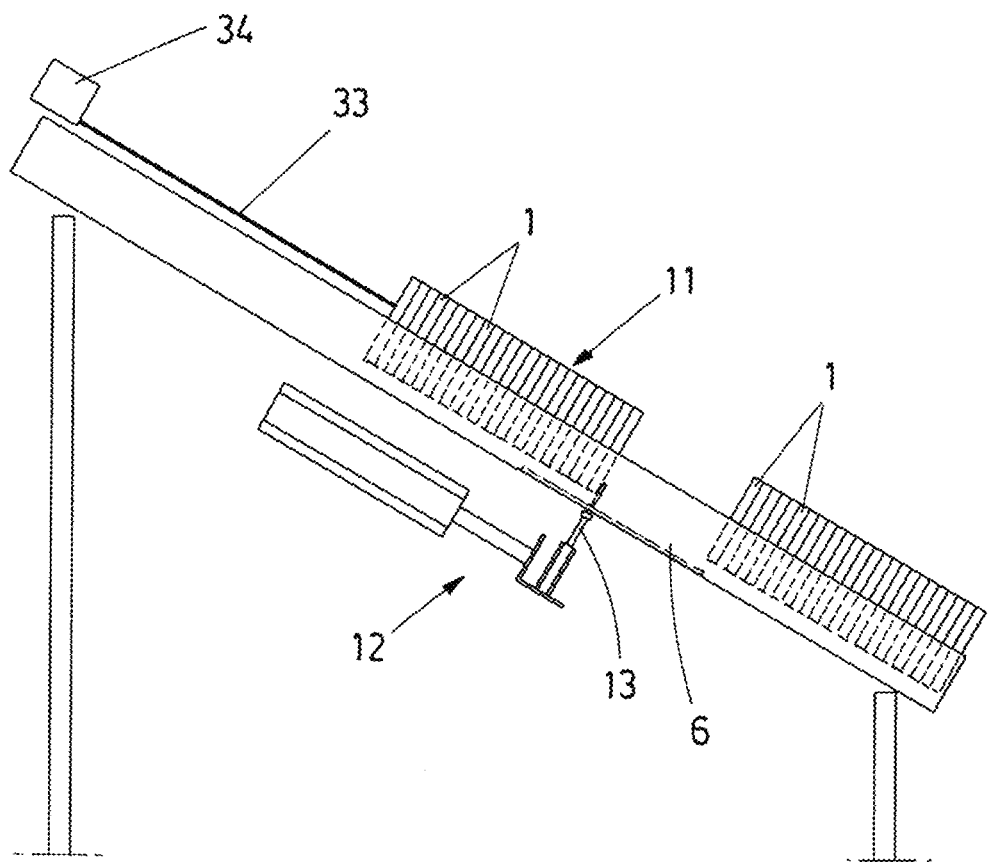
FIG. 2 shows a detail view of the support and the formation of sub-stacks.
Figure 3:
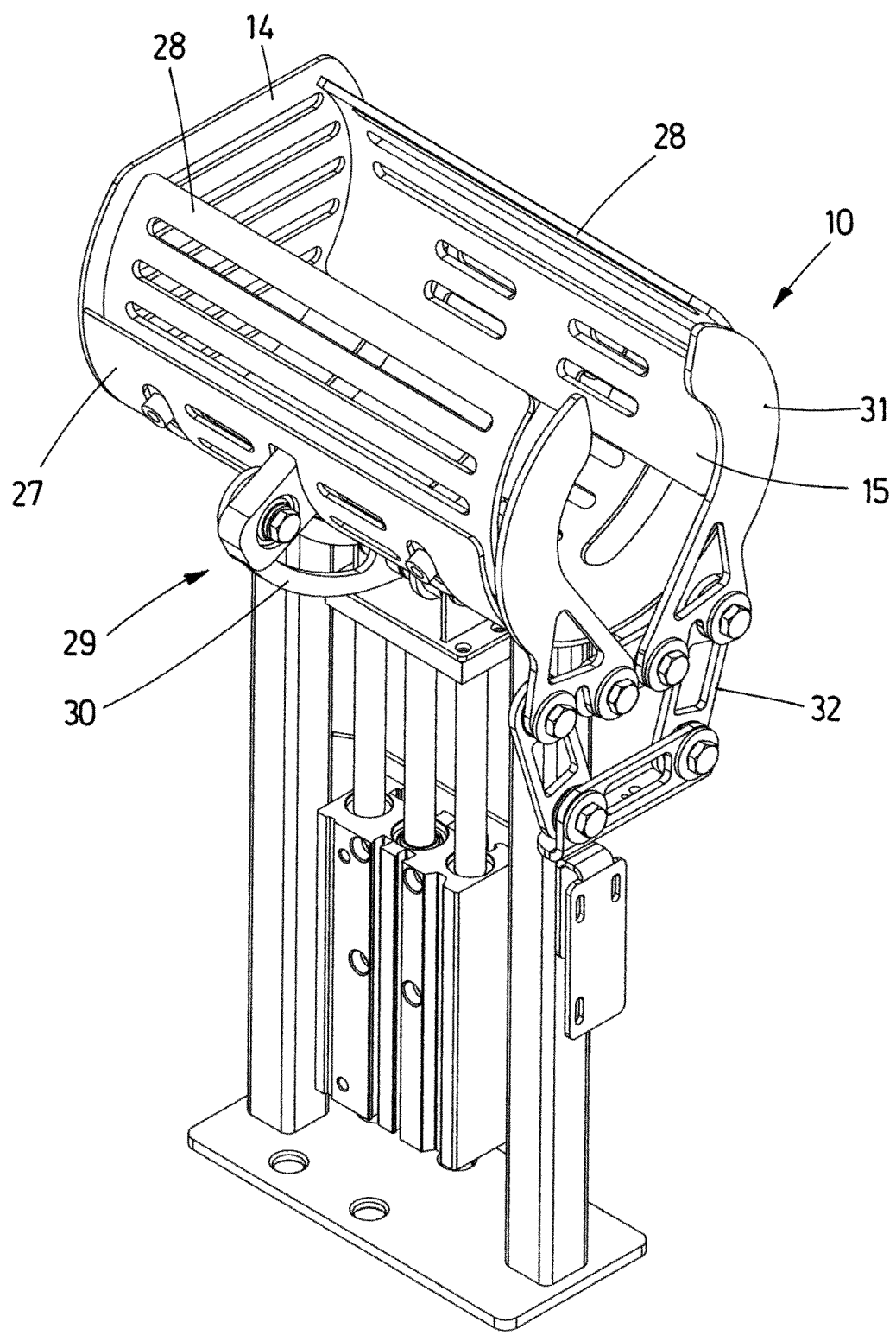
FIG. 3 shows a detail of one of the grippers.
Figure 4:
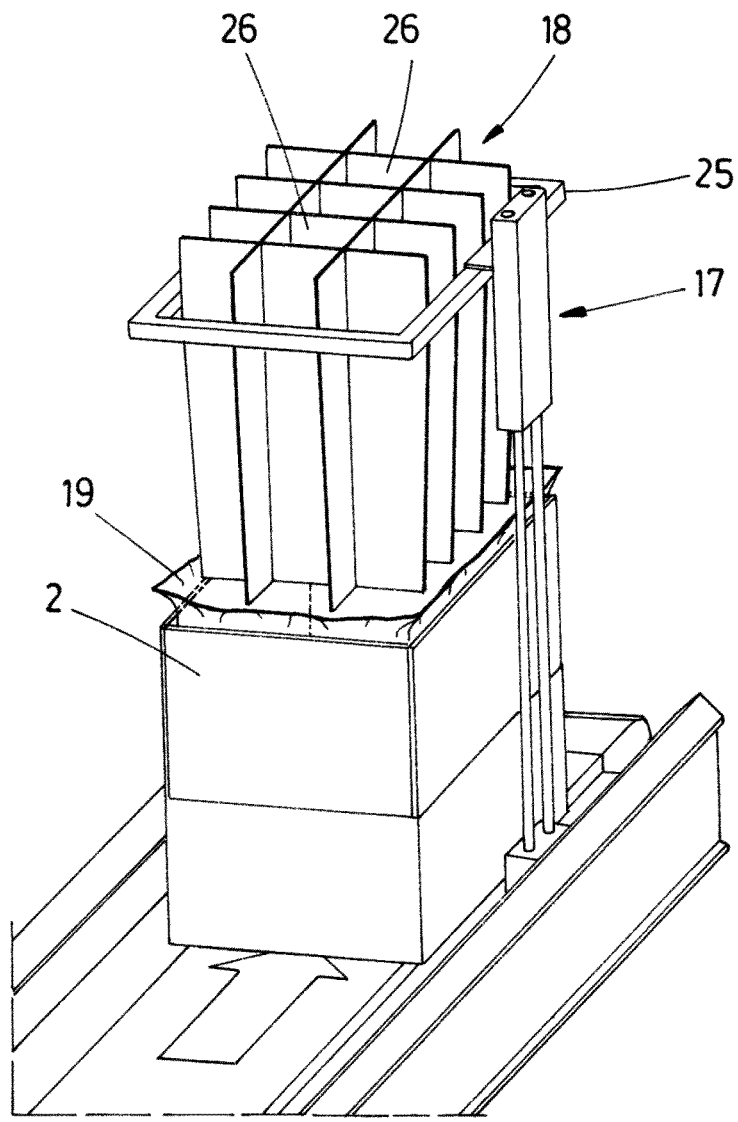
FIG. 4 illustrates a detail of the frame and the grid pattern.

A detailed description of a preferred exemplary embodiment is provided below with the aid of the attached aforementioned FIGS. 1-4, according to a first aspect of the invention, of an automatic conditioning station for frozen products (1) that without loss of generality, are frozen hamburgers (1).

In the example represented that will be explained below, the conditioning station of the invention is located in a frozen hamburger (1) manufacturing facility, wherein the hamburgers (1) are preferably first shaped and then frozen, so that they arrive at the conditioning station in a frozen state, to be packaged in boxes (2) meeting predetermined weight conditions. For this, the conditioning station comprises the following two substations:
a packaging substation, wherein groupings (3) of frozen hamburgers are automatically loaded into the boxes (2); and
a finishing substation, wherein the weight of the boxes (2) loaded with frozen hamburgers (1) is automatically checked and, where appropriate, said weight is adjusted by incorporating one or several loose frozen hamburgers (1).

In the manufacturing facility, hamburgers (1) are prepared and subsequently frozen. The frozen hamburgers (1) go through a visual verification system (not shown in the figures) that checks previously specified format requirements, such as shape, Cartesian dimensions and thickness, and separates the frozen hamburgers (1) into accepted and rejected, based on pre-established criteria. Visual verification can be performed after freezing the hamburgers (1), as just explained, although it is preferable to also do it before freezing. In general, it is important to do a visual verification both before and after freezing, for different reasons. In particular, visual verification is more important after freezing because the hamburgers (1) can break and deform during freezing, causing problems for the operation of the station.

The frozen and, where appropriate, verified hamburgers (1), are transported, on conveyor belts (4), so that they arrive, in an aligned and ordered manner, towards the packaging substation.

The packaging substation comprises a grouper (5), such as a stacker (5), which receives frozen hamburgers (1), for example, through the conveyor belts (4), and forms one or more groupings (3), such as stacks (3), with the received frozen hamburgers (1), which are supported on respective supports (6), which are preferably inclined. The number of groupings (3), specifically, of stacks (3) can depend on the dimensions of the hamburgers (1). In the figures, by way of example, the represented grouper (5) forms five stacks (3).

The packaging substation additionally comprises at least one feeder (7) to feed empty boxes (2) to one or more loading positions (8) of the packaging substation. The feeder (7) can be, without loss of generality, either of the type that feeds pre-formed boxes (2), or it can be of the type that feeds cardboard sheets and forms the boxes (2).

Likewise, the packaging substation includes at least one loading robot (9) equipped with a gripper (10) to take sub-stacks (11) of hamburgers (1) from the stacks (3) and transfer them to the boxes (1), in synchronisation with the feeder (7). By way of example, there are two loading robots (9) in the embodiment shown, arranged on both sides of a single feeder (7), as well as two loading positions (8), to enable simultaneous work of the two loading robots (9). The invention is applicable, without loss of generality, to the case of a single loading robot (9), as well as to more than two loading robots (9), for example, three loading robots (9).

Preferably, the packaging substation has detection means 91 to determine the number of hamburgers (1) stacked in each stack (3) and the thickness, i.e., the total height, of each stack (3). When the number of hamburgers (1) and the height of the stack (3) meet predetermined stacking requirements, for example, the stack (3) reaches a pre-established number of hamburgers (1), or a predetermined maximum height, separation means (12) isolate the hamburgers (1) from said stack (3), which form a sub-stack (11), separating them from the rest of the hamburgers (1) of the stack (3). The separation means (12) can include claws (13) installed in the supports (6), which move the sub-stacks (11) upwards, making them independent from the stack (3) that is continuously being formed as it is fed with hamburgers (1).

At that moment the gripper (10) of the loading robot (9) catches the sub-stack (11) and introduces it into the box (2). Preferably, the gripper (10) comprises a side hatch (14) that closes surrounding the sub-stack (11). If the hamburgers (1) are deposited in the box (2) horizontally, the side hatch (14) opens in order to drop the hamburgers (1) from the sub-stack (11) into the box (2). If they are vertically deposited, the gripper (10) has a lower hatch (15) that opens in order to drop the hamburgers (1). Normally, any box format (2) is intended to be filled only horizontally or only vertically, although the loading robot (9) is preferably configured for horizontal loading and for vertical loading, for example, including both the side hatch (14) and the lower hatch (15). The gripper (10) can be appropriately configured depending on the specific shape of the hamburgers (1). For example, it can be configured to catch round hamburgers (1) as well as oval hamburgers (1).

The figures show a preferred example of the operation of the gripper (10), which is explained below. Each gripper (10) has an outer tubular frame (27), and two inner tubular portions (28), concentric to the frame (27), and moveable, by means of a first drive (29), such as by connecting rods (30), to open the side hatch (14), which allows the gripper (10) to be brought closer to the sub-stacks (11) and to trap said sub-stacks (11), and then close the side hatch (14), to retain, without damaging, the frozen hamburgers (1). This configuration also serves to unload the sub-stacks (11) in case of horizontal filling, as explained above; it would be enough to arrange the gripper (10) horizontally on the box (2) and open the side hatch (14). In the event of vertical filling, the gripper (10) can also include a closure (31) to open and close the lower hatch (15), by means of a second drive (32). When the gripper (10) is loaded, it is moved towards the box (2), being arranged on the vertical of the box (2), where appropriate, in the corresponding position thereof, at which time the second drive (32) drives the closure (31) to open the lower hatch (15) and drop the sub-stack (11). The interior of the tubular portions (28) is designed and dimensioned so that the hamburgers (1) fall completely vertically, avoiding friction on the walls, in addition to absorbing tolerance differences of the hamburgers (1), making said tolerances coincide, where appropriate, with those of the grid pattern (18), to prevent jams in the loading of the box (2).

In the example represented in the figures, when the sub-stack (11) grows as frozen hamburgers (1) accumulate in the support (6), a laser (33) emitted by a meter (34) measures the position of a stop of the sub-stack (11), so that, when it reaches a predetermined position, the separation means (12), where appropriate the claw (13), are driven by means of a signal sent by the meter (34) to a drive (16) pushing the claw (13) towards the sub-stack (11) and thus separating said sub-stack (11) into two portions, so that, as explained above, the gripper (10) of the loading robot (9) performs the operation of collecting the sub-stack (11) from that position in the support (6) to carry out the rest of the loading operation.

The loading robot (9) deposits sub-stacks (11) of hamburgers (1) in the box (2) according to pre-established parameters that are related to the number of hamburgers (1) loaded and the weight of the box (2) loaded. For example, both the number of hamburgers (1) and the weight of the loaded box (2) can be within a pre-established range. In this sense, the packaging substation can further include a packaging scale 90 to weigh the box (2) as it is being filled.

Optionally, the packaging substation further includes a frame (17) intended to introduce into the box (2), once in the loading position (8), before being loaded, a grid pattern (18) with cells (26) that defines a predetermined loading format, to partition the box (2) and facilitate the filling thereof. In this way, the ordered loading of the hamburgers (1) in the box (2) is simplified, since the loading robot (9) can alternatively deposit a sub-stack (11) in each partition generated by the grid pattern (18). The frame (17) can be optionally configured to clamp a liner (19) inside the box (2), commonly a plastic bag (19), without collapsing or falling into the box (2), wherein, for example, the frame may include a hold-down plate (25) to clamp the liner (19). The presence of the frame (17) and the grid pattern (18) enables two operations to be fulfilled. In the first place, the grid pattern (18), together with the cells (26) thereof, are configured according to the loading format for the selected box (2) and according to how the product is to be loaded in that box (2) in particular. Likewise, the cells (26), in addition to serving as a guide so that the frozen hamburgers (1) enter, i.e., fall, in the box (2) in their correct place during the loading operation, they also maintain, once loaded, the frozen hamburgers (1) in their correct position, to prevent the sub-stacks (11) from collapsing and, therefore, interfering with the subsequent operations of loading frozen hamburgers (1) in the cells (26) that are still empty waiting to be loaded. Secondly, the frame (17), in addition to supporting the grid pattern (18) in the correct position and allowing it to rise and fall according to the cycle in which it is during the loading operation, also clamps the bag (19) inside the box (2) by the upper edges of the box (2). This clamping is important to prevent the bag (2) from collapsing into the box (2) in the event that the bag (19) was not perfectly placed inside the box (2) or there were air spaces between the inner side of the box (2) and the bag (19), as it usually happens when a plastic bag (19) is placed in a receptacle.

For its part, the finishing substation contains a finishing scale (not shown), which weighs the box (2) that has been loaded in the finishing station, and a dispenser (20), which is configured to introduce an exact number of frozen hamburgers (1) into the loaded boxes (2) after loading by the loading robot (9). The substation is programmed for slightly under loading of the boxes (2), i.e., so that the number of hamburgers (1) and/or the length of the sub-stack (11) taken by the loading robot (9) in each operation, are such that the weight of the box (2) at the end of the loading does not exceed a certain set point so much as to make it necessary to remove individual frozen hamburgers (1). However, the finishing station is programmed so that the weight of the box (2) after loading by the loading robot (9) is not less, i.e., it is equal to or greater than a predetermined weight value. This makes it possible that, once the box (2) has been weighed by the finishing scale, it is not necessary to (manually) remove frozen hamburgers (1) from the loaded box, but only, where appropriate, to add individual hamburgers (1) (i.e., in the exact number required) by means of the dispenser (20).

Preferably, the packaging scale is the same as the finishing scale. In particular, based on the discrepancy in weight, the station determines how many hamburgers (1) are to be included by the dispenser (20).

The figures show the box (2) that has been loaded in the packaging substation being transferred to the position of the dispenser (20). Alternatively, although not represented, the dispenser (20) may be arranged so as to introduce hamburgers (1) into the loaded box (2) at the loading position (8), without the need to move the loaded box (2).

The figures represent a single dispenser (20), although there may be several dispensers (20) in coordination with the loading robots (9) in other embodiments.

Also, preferably, the dispenser (20) is configured to be loaded by the loading robot (9). For example, the dispenser (20) contains a tank (21), for example a vertical tank (21), which is loaded, for example, vertically by the loading robot (9). By way of example, as illustrated in the figures, the dispenser (20) comprises two overlapping plates (22, 23), for example, two circular plates (22, 23), an upper plate (22) with a plurality of upper through-holes (24) to house frozen hamburgers (1) coming from the tank (21), and a lower plate (23), with at least one lower through-hole (not shown) to drop the frozen hamburger (1) into the loaded box (2). The upper plate (22) is rotatable with respect to the lower plate (23), according to a vertical axis coaxial to the two plates (22, 23), to face the hamburgers (1) with the lower through-hole and, preferably, also rotatable with respect to the tank (21), to receive hamburgers (1) from the tank (21) in the upper through-holes (24).

Moreover, optionally, the dispenser (20) incorporates a time meter (not shown) that determines the time spent by the frozen hamburgers (1) in the tank (21). This is important due to sanitary considerations. The hamburgers (1) must only remain in the tank (21) for a predetermined maximum time, after which they must be disposed of, for example, half an hour. The timer is associated with a warning device (not shown), which shows the spent time and/or emits warning messages, informing that the predetermined maximum time is approaching or has been exceeded.

The invention claimed is:

1. A conditioning station for a frozen food, the conditioning station comprising:
   at least one loading position;
   at least one feeder for feeding empty boxes to the at least one loading position;
   at least one loading robot equipped with a gripper to take groupings of the frozen food and transfer them to the boxes in the loading positions, in synchronization with the feeder;
   a scale for automatically weighing the boxes; and
   at least one dispenser to automatically deposit one or more individual units of frozen food in the loaded boxes;
   wherein the conditioning station is controlled to load the boxes such that, at the end of the loading by means of the loading robot, the loaded boxes have a weight selected from:
      equal to or less than a predetermined lower set point; and
      higher than the lower set point by a value not higher than a predetermined tolerance, so as not to have to remove any individual unit from the frozen food;
   wherein the conditioning station is further controlled so that, after the deposit by the dispenser, the weight of the loaded box is equal to or greater than that of the predetermined lower set point within the predetermined tolerance.

2. The conditioning station according to claim 1, wherein the dispenser is configured to be loaded by the at least one loading robot.

3. The conditioning station according to claim 2, wherein the dispenser contains at least one tank to be loaded by the loading robot.

4. The conditioning station according to claim 2, wherein the dispenser comprises two superimposed plates, comprising:
   an upper plate, with a plurality of upper through-holes to house units of the frozen food coming from the tank, and
   a lower plate, with at least one lower through-hole to drop the unit of frozen food into the box.

5. The conditioning station according to claim 4, wherein the upper plate is rotatable with respect to the lower plate, according to a vertical axis coaxial to the two plates, to face the units of frozen food with the lower through-hole.

6. The conditioning station according to claim 5, wherein the upper plate is additionally rotatable with respect to the tank, to receive units of frozen food from the tank in the upper through-holes.

7. The conditioning station according to claim 1, further comprising a grouper, which receives units of the frozen food, to form one or more groupings with said received units of the frozen food, to be transferred by the loading robot to the boxes.

8. The conditioning station according to claim 7, wherein the grouper comprises respective supports to support the groups.

9. The conditioning station according to claim 8, wherein the supports are inclined.

10. The conditioning station according to claim 8,
    wherein the conditioning station further comprises a separation means to isolate the frozen foods from each grouping, which form a sub-grouping, separating the frozen foods of the sub-grouping with respect to the remaining frozen foods of the grouping, and
    wherein the separation means include claws installed on the supports, which move the sub-groupings upwards, making the sub-grouping independent with respect to the grouping.

11. The conditioning station according to claim 1, further comprising a detection means to determine the number of individual units of frozen food grouped in each grouping and the total thickness of each grouping.

12. The conditioning station according to claim 1, wherein the conditioning station further comprises a separation means to isolate the frozen foods from each grouping, which form a sub-grouping, separating the frozen foods of the sub-grouping with respect to the remaining frozen foods of the grouping.

13. The conditioning station according to claim 12, further comprising a meter emitting a laser, to detect a stop position of the sub-grouping of the grouping, the station being configured so that, when the meter detects that the stop position reaches a predetermined location, the separation means are actuated.

14. The conditioning station according to claim 12, wherein the gripper comprises a side hatch that closes surrounding the sub-grouping of frozen foods.

15. The conditioning station according to claim 14, wherein the side hatch is controlled to open in order to deposit the sub-grouping in the box horizontally.

16. The conditioning station, according to claim 14, wherein the gripper comprises an outer tubular frame, and two inner tubular portions, concentric to the frame, and moveable, by means of a first drive, to open and close the side hatch.

17. The conditioning station according to claim 14, wherein the gripper further comprises a lower hatch that opens in order to drop the sub-grouping into the box vertically.

18. The conditioning station according to claim 17, wherein the gripper additionally further includes a closure to open and close the lower hatch, by means of a second drive.

19. The conditioning station according to claim 1, further comprising a frame intended to introduce into the box, once in the loading position, before being loaded, a grid pattern that defines a predetermined loading format, to partition the box during loading.

20. The conditioning station according to claim 19, wherein the frame is configured to clamp a bag inside the box.

21. The conditioning station according to claim 1, wherein the frozen food comprises frozen hamburgers.

* * * * *